No. 712,317. Patented Oct. 28, 1902.
A. A. MANNINGS.
PIN.
(Application filed Apr. 1, 1902.)
(No Model.)
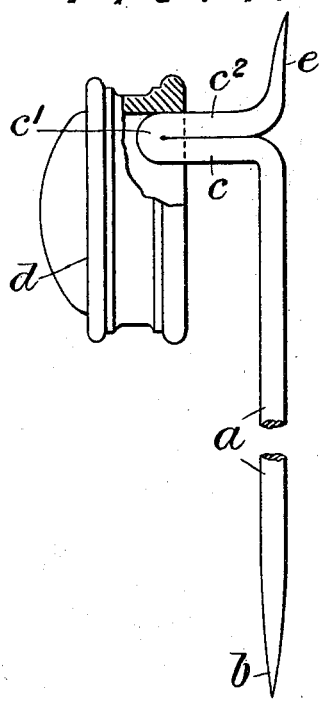
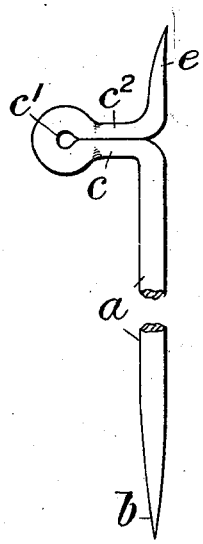
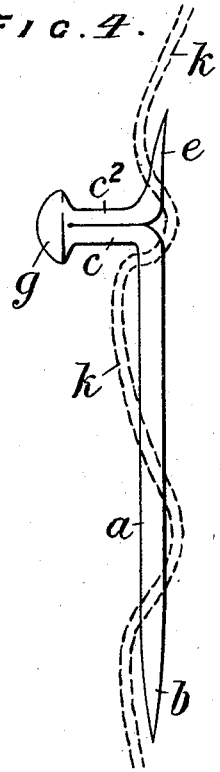
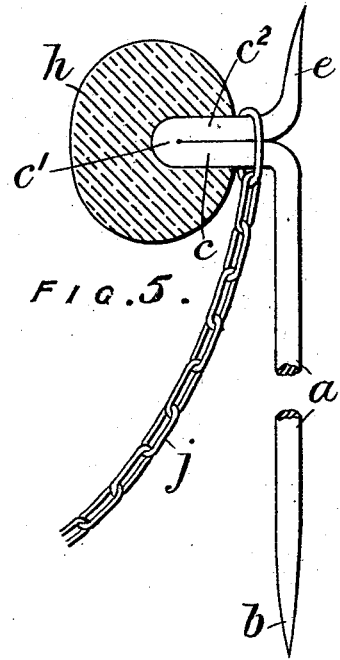
WITNESSES:
INVENTOR
Alfred Austin Mannings
BY
ATTORNEYS

UNITED STATES PATENT OFFICE.

ALFRED AUSTIN MANNINGS, OF LONDON, ENGLAND.

PIN.

SPECIFICATION forming part of Letters Patent No. 712,317, dated October 28, 1902.

Application filed April 1, 1902. Serial No. 100,966. (No model.)

*To all whom it may concern:*

Be it known that I, ALFRED AUSTIN MANNINGS, jeweler, a subject of the King of Great Britain, residing at 188 Alexandra road, Kilburn, London, England, have invented new and useful Improvements in Pins, of which the following is a specification.

My invention relates to an improvement in scarf and other pins, having for its object to insure the permanence of the engagement of the pin in the fabric of the article in which it is inserted, the invention being applicable to jewelry, such as scarf-pins, to security-pins for brooches, and other ornaments or trinkets, and to common dress-pins for uniting the parts of wearing-apparel.

The invention consists of a pin having a lateral projecting arm to carry the head of the pin and a pointed spur or barb oppositely directed to the point of the shank, the arm and the spur or barb being formed integrally with the shank by a wire being doubled on itself to form the arm and in opposite directions to form the shank and spur portions.

The invention further consists in the peculiar construction which will be hereinafter more fully described and claimed.

The invention will be described with reference to the accompanying drawings, forming part of this specification, wherein I have represented various modifications of the invention drawn to a magnified scale.

Figure 1 shows a side view of the improvement as applied to a scarf-pin, the spur or barb being formed in one with the shank of the pin. Fig. 2 shows a common dress-pin with a looped head and with the spur or barb made in one piece with the shank, as in Fig. 1. Fig. 3 is a cross-section of the neck shown by Fig. 2. Fig. 4 shows a pin similar to Fig. 2, but provided with a pressed-up head. Fig. 5 shows a pin made as in Fig. 1 with a fancy head formed of a glass or other bead cemented on.

Referring to Fig. 1, $a$ is the ordinary shank of a scarf-pin, but made plain instead of being screw-threaded to retain it in the scarf. It is made with the usual pointed end $b$ and is provided toward its other end with the usual arm $c$, substantially at right angles to the shank $a$ for the attachment of the head or jewel-setting $d$ of the scarf-pin. $e$ is the spur or barb of my invention. It projects substantially in line with the shank, with its point oppositely directed to the point $b$ and preferably slightly bent backward away from the head $d$ to facilitate its withdrawal from the fabric without liability of its point fraying the material. In Fig. 1 this spur or barb $e$ is made integral with the shank $a$ by bending the wire of which the shank is made, as at $c'$, so as to fold or double the wire upon itself, and so form an arm of double wire $c\ c^2$, the shank $a$ being bent down at right angles to the part $c$ and the spur or barb $e$ being formed by bending the wire upward at right angles to $c^2$. In the case of a scarf-pin this double arm $c\ c^2$ is united to the head or setting $d$ of the pin by soldering.

Referring now to Fig. 2, the arm of the shank is made by doubling the wire upon itself, as at $c\ c'\ c^2$, and the spur or barb is formed as before described in reference to Fig. 1; but in this case the members $c\ c^2$ of the arm, originally each of round section, are pressed together between dies, so as to flatten them and bring them to as nearly as possible juxtaposed semicircular form in cross-section, as shown in Fig. 3, leaving the bend $c'$ of its original form and dimensions, thus forming a head of sufficient size to be easily gripped. Instead of the head $c'$ being left in the form of a bend, as in Fig. 2, it may be pressed in dies to the form of a common pin-head, as shown at $g$ in Fig. 4, the flattened neck portion $c\ c^2$ being firmly held and supported against being upset or bent by the dies in which it is pressed while the pressure or blow of the heading-punch is applied to upset the bend and form the head $g$.

In Fig. 5 the shank, arm, and spur or barb are made as in Fig. 1, and a fancy head $h$, formed of a glass or other bead, is cemented onto the arm $c\ c^2$.

When intended to be used as a security-pin for brooches or other ornaments, a light chain, such as $j$, Fig. 5, would be connected at one end to the brooch or article to be secured and at the other to a convenient part of the pin—as, for instance, to the loop $c'$ in Fig. 2 or to the arm $c\ c^2$, as in Fig. 5.

In using any of the above-described pins the shank $a$ is inserted in the fabric in the usual manner until the arm $c$ comes against the fabric $k$ (shown in dotted lines in Fig. 4) adjacent to the place where the point of the shank was first inserted with sufficient pressure to strain or pull the fabric in the direction of the point of the shank, after which the shank is moved slightly in the opposite direction at same time that the point of the spur or barb $e$ is inserted through the fabric, wherein it is securely retained by reason of the fabric $k$ being put under strain by the arm $c$, as above mentioned, opposing the retraction of the spur or barb $e$.

I claim—

1. A scarf or other pin having a laterally-projecting arm to carry the head of the pin and a pointed spur or barb oppositely directed to the point of the shank, the arm and the spur or barb being formed integrally with the shank by the wire being doubled on itself to form the arm and in opposite directions to form the shank and spur portions.

2. A pin having an arm laterally projecting from the shank and terminating in a head and a pointed spur or barb oppositely directed to the point of the shank, the arm and its head and the spur or barb being formed integrally with the shank, the doubled members of which the arm is formed being pressed together and flattened to form a neck leaving an enlargement or head at the end of the arm.

3. A pin having a laterally-projecting arm terminating in a head, and a pointed spur or barb oppositely directed to the point of the shank, the arm and its head and the spur or barb being formed integrally with the shank by the wire being doubled on itself to form the arm, the doubled members of which the arm is formed being pressed together and flattened to form a neck and the head being formed by upsetting the end of the arm.

ALFRED AUSTIN MANNINGS.

Witnesses:
C. G. CLARK,
T. W. KENNARD.